(12) United States Patent  
Kanamori et al.

(10) Patent No.: US 8,432,103 B2
(45) Date of Patent: Apr. 30, 2013

(54) LED DRIVE CIRCUIT, LED ILLUMINATION FIXTURE, LED ILLUMINATION DEVICE, AND LED ILLUMINATION SYSTEM

(75) Inventors: Atsushi Kanamori, Osaka (JP); Yasuhiro Maruyama, Osaka (JP); Yoshiki Ikuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 241 days.

(21) Appl. No.: 12/870,939

(22) Filed: Aug. 30, 2010

(65) Prior Publication Data

US 2011/0095700 A1 Apr. 28, 2011

(30) Foreign Application Priority Data

Oct. 26, 2009 (JP) ................................. 2009-245475

(51) Int. Cl.
*H05B 37/02* (2006.01)
(52) U.S. Cl.
USPC .................. 315/209 R; 315/291; 315/360
(58) Field of Classification Search .............. 315/209 R, 315/224, 246, 291, 299, 360
See application file for complete search history.

(56) References Cited

U.S. PATENT DOCUMENTS

| | | | |
|---|---|---|---|
| 6,057,651 A | 5/2000 | Usami | |
| 7,759,881 B1 * | 7/2010 | Melanson | 315/307 |
| 7,936,132 B2 * | 5/2011 | Quek et al. | 315/291 |
| 8,107,825 B2 * | 1/2012 | Rajagopal et al. | 398/172 |
| 2008/0150450 A1* | 6/2008 | Starr et al. | 315/294 |
| 2008/0258647 A1 | 10/2008 | Scianna | |
| 2009/0102399 A1 | 4/2009 | Kita | |
| 2010/0219764 A1 | 9/2010 | Yamasaki et al. | |
| 2010/0301765 A1* | 12/2010 | Wang et al. | 315/291 |
| 2012/0139431 A1 | 6/2012 | Thompson et al. | |

FOREIGN PATENT DOCUMENTS

| | | |
|---|---|---|
| CN | 101513122 A | 8/2009 |
| JP | 2000-173304 A | 6/2000 |
| JP | 2001-215913 A | 8/2001 |
| JP | 2003-151782 A | 5/2003 |
| JP | 2005-11739 A | 1/2005 |
| JP | 2005-26142 A | 1/2005 |
| JP | 2006-319172 A | 11/2006 |
| JP | 2007-227155 A | 9/2007 |
| JP | 2007-538378 A | 12/2007 |
| JP | 2009-43694 A | 2/2009 |
| JP | 2009-104848 A | 5/2009 |
| JP | 2009-123681 A | 6/2009 |
| JP | 2009-238525 A | 10/2009 |
| JP | 2011-003467 A | 1/2011 |
| KR | 10-2006-0098345 A | 9/2006 |
| KR | 2008-0047521 A | 5/2008 |

OTHER PUBLICATIONS

Product Data Sheet in Japaense of the SSL2101 LED Driver IC Manufactured by NXP Semiconductors and English translation of relevant portions; Rev. 04; Aug. 28, 2009.

* cited by examiner

*Primary Examiner* — Thuy Vinh Tran
(74) *Attorney, Agent, or Firm* — Birch, Stewart, Kolasch & Brich, LLP

(57) ABSTRACT

An LED drive circuit in which an alternating voltage is input and an LED is driven, and which is capable of connecting to a phase control dimmer. The LED circuit is provided with a current extractor for extracting a current from a power supply feed line for feeding an LED drive current to the LED; and an extraction timing adjuster for operating the current extractor for a predetermined period of time after the start of a voltage fluctuation in the power supply feed line, the voltage fluctuation accompanying output oscillation of the phase control dimmer.

15 Claims, 17 Drawing Sheets

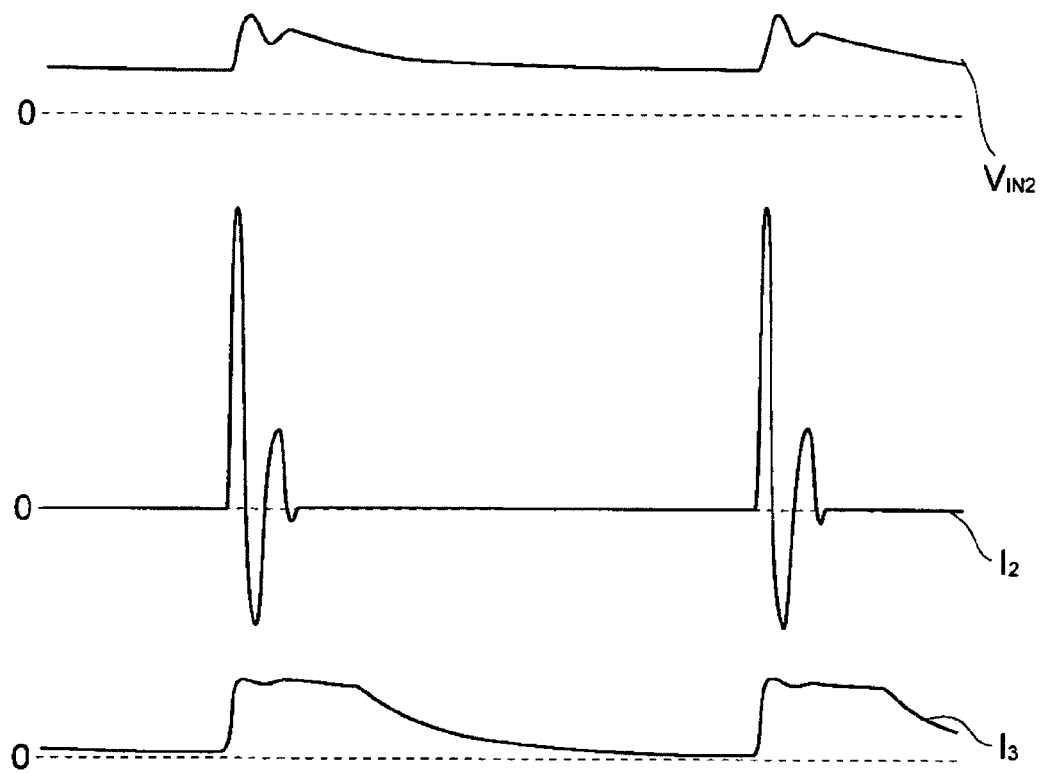

LED DRIVE CIRCUIT, LED ILLUMINATION FIXTURE, LED ILLUMINATION DEVICE, AND LED ILLUMINATION SYSTEM

This nonprovisional application claims priority under 35 U.S.C. §119(a) on Patent Application No. 2009-245475 filed in Japan on Oct. 26, 2009, the entire contents of which are hereby incorporated by reference.

BACKGROUND OF THE INVENTION

1. Field of the Invention

The present invention relates to an LED drive circuit for driving an LED (light emitting diode), as well as to an LED illumination fixture, an LED illumination device, and an LED illumination system having an LED as a light source.

2. Description of Related Art

LEDs have such characteristics as low current consumption and long service life, and LED applications are expanding not only to display devices but to illumination fixtures and the like. In LED illumination fixtures, a plurality of LED units is often used in order to obtain the desired lighting intensity.

Common illumination fixtures usually use a commercial AC 100 V power supply, and in cases in which an LED illumination fixture is used in place of an incandescent bulb or other common illumination fixture, it is preferred that the LED illumination fixture also be configured to use a commercial AC 100 V power supply, as with a common illumination fixture.

In the case of applying dimmer control to an incandescent bulb, a phase control dimmer (commonly referred to as an incandescent light control) is used in which dimmer control can easily be applied to the supply of power to the incandescent bulb by a single volume element, by switching on a switching element (usually a thyristor element or triac element) at a certain phase angle of an alternating-current power supply voltage. However, in cases in which an incandescent bulb is dimmed by a phase control dimmer, flickering or blinking is known to occur, and normal dimming is not possible when a low-wattage incandescent bulb is connected to the dimmer.

The same type of phase control dimmer used for dimmer control of an incandescent bulb is preferably used in cases in which dimmer control is applied to an LED illumination fixture that uses an alternating-current power supply. FIG. 17 shows an example of a conventional LED illumination system whereby dimmer control can be applied to an LED illumination fixture that uses an alternating-current power supply.

The LED illumination system shown in FIG. 17 is provided with a phase control dimmer 2, an LED drive circuit having a diode bridge DB1 and a current limiting circuit 5, and an LED module 3. The phase control dimmer 2 is connected in series between an alternating-current power supply 1 and the LED drive circuit. In the phase control dimmer 2, when the knob (not shown in the drawing) of a semi-fixed resistor Rvar1 is set to a certain position, a triac Tri1 is switched on at a power supply phase angle corresponding to the set position. A noise prevention circuit using a capacitor C1 and an inductor L1 is also provided in the phase control dimmer 2, and terminal noise returning to the power supply line from the phase control dimmer 2 is reduced by the noise prevention circuit.

FIG. 19A shows an example of the voltage and current waveform of each component when an incandescent bulb 8 is operated by the phase control dimmer 2 (see FIG. 18), and FIG. 19B shows an enlarged view of segment P in FIG. 19A. In FIGS. 19A and 19B, $V_{OUT2}$, $I_2$, and $I_9$ indicate the output voltage waveform of the phase control dimmer 2, the waveform of the current flowing to the triac Tri1 in the phase control dimmer 2, and the waveform of the current flowing to the incandescent bulb 8, respectively. In the example shown in FIGS. 19A and 19B, immediately after a trigger occurs and the triac Tri1 switches on, the current flowing to the triac Tri1 flows to the incandescent bulb 8 after oscillating several times between positive and negative.

FIG. 20A shows an example of the voltage and current waveform of each component when the LED illumination system shown in FIG. 17 is operated, and FIG. 20B shows an enlarged view of segment P in FIG. 20A. In FIGS. 20A and 20B, $V_{IN2}$, $I_2$, and $I_3$ indicate the input voltage waveform of the phase control dimmer 2, the waveform of the current flowing to the triac Tri1 in the phase control dimmer 2, and the waveform of the current flowing to the LED module 3, respectively. In the example shown in FIGS. 20A and 20B, immediately after a trigger occurs and the triac Tri1 switches on, the current flowing to the triac Tri1 oscillates several times, and when the triac Tri1 switches on at a certain phase, the waveform becomes as if an oscillation had occurred, and normal dimming is not accomplished. As shown in FIG. 20B, which is an enlarged view of segment P in FIG. 20A, a process repeats in which the triac Tri1 switches off after the current flowing to the triac Tri1 has oscillated several times between positive and negative, the trigger then occurs again, the current flowing to the triac Tri1 oscillates several times between positive and negative, and the triac Tri1 then switches off. This is because the current flowing to the triac Tri1 decreases below a holding current when changing from positive to negative, and once the triac Tri1 has switched off, a period of time ensues in which the triac Tri1 does not respond for a certain time, and until the next trigger occurs after this period has elapsed, the current flowing to the triac Tri1 is below the holding current.

The LED illumination system shown in FIG. 21 is disclosed in Japanese Laid-open Patent Application No. 2006-319172. The LED illumination system shown in FIG. 21 is provided with a phase control dimmer 2, a diode bridge DB1, current holding means, rectifying/smoothing means, and an LED module 3. The phase control dimmer 2 is connected in series between an alternating-current power supply 1 and the diode bridge DB1, and the current holding means and the rectifying/smoothing means are provided between the diode bridge DB1 and the LED module 3.

The current holding means is composed of resistors R181 through R186, Zener diodes ZD1 and ZD2, transistors Q181 and Q182, and a capacitor C181. In the current holding means, in a case in which the power supply voltage outputted from the alternating-current power supply 1 is 100 V or lower, the transistor Q182 switches on and a current is applied which corresponds to the holding current of the triac Tri1 in the phase control dimmer 2. The transistor Q182 switches off in a case in which the power supply voltage is not 100 V or lower. The transistor Q182 applies a current (about 30 mA) such that the current flowing through the triac Tri1 in the phase control dimmer 2 does not drop below the holding current.

However, in the current holding means described above, the time during which the collector current of the transistor Q182 is flowing is the period from the time the transistor Q182 switches on until the time the transistor Q181 switches on, and the transistor Q181 switches on when the Zener diode ZD1 switches on after the triac Tri1 in the phase control dimmer 2 has switched on. In other words, in such cases as when the triac Tri1 in the phase control dimmer 2 rises steeply, or when the power supply voltage of the alternating-current power supply 1 is high, the transistor Q182 is on for only a short period, and a current that does not drop below the holding current of the triac Tri1 is flowing for only a short time. Cases therefore occur in which the triac Tri1 cannot switch on.

SUMMARY OF THE INVENTION

An object of the present invention is to provide an LED drive circuit capable of reducing LED flicker, which can occur when an LED is used with a phase control dimmer, and to provide an LED illumination fixture, an LED illumination device, and an LED illumination system provided with the LED drive circuit.

In order to achieve the objects outlined above, the LED drive circuit according to the present invention is an LED drive circuit in which an alternating voltage is input and an LED is driven, and which is capable of connecting to a phase control dimmer; and the LED drive circuit comprises a current extractor for extracting a current from a power supply feed line for feeding an LED drive current to the LED; and an extraction timing adjuster for operating the current extractor for a predetermined period of time after the start of a voltage fluctuation in the power supply feed line, the voltage fluctuation accompanying output oscillation of the phase control dimmer.

Preferably, the extraction timing adjuster has a differentiator for inputting the voltage of the power supply feed line, and operation of the current extractor is determined using the output of the differentiator.

The extraction timing adjuster may operate the current extractor when the output of the differentiator exceeds a certain value.

The extraction timing adjuster may determine the operating time of the current extractor in accordance with the output value of the differentiator.

The extraction timing adjuster may continue to operate the current extractor until the output of the differentiator falls below a certain value.

The extraction timing adjuster may determine the amount of current extraction of the current extractor in accordance with the output value of the differentiator.

The extraction timing adjuster may determine operation of the current extractor by using an envelope curve of the output of the differentiator.

The extraction timing adjuster may also operate the current extractor when a phase control element of the phase control dimmer is off. The extraction timing adjuster may also have a delay unit, wherein the delay time of the delay unit has a positive correlation with the output value of the differentiator, and the extraction timing adjuster stops operation of the current extractor when the delay time has elapsed after the output of the differentiator has exceeded a certain value.

The differentiator may have a voltage divider circuit for dividing the voltage of the power supply feed line at an input stage.

In order to achieve the objects outlined above, the LED illumination fixture according to the present invention comprises the LED drive circuit according to any of the aspects described above, and an LED connected to an output side of the LED drive circuit, or comprises an LED and an LED flicker reduction unit for reducing flickering of the LED due to voltage fluctuation of a power supply feed line, the voltage fluctuation accompanying output oscillation of a phase control dimmer.

In order to achieve the objects outlined above, the LED illumination device according to the present invention comprises the LED drive circuit according to any of the aspects described above, or the LED illumination fixture according to any of the aspects described above.

In order to achieve the objects outlined above, the LED illumination system according to the present invention comprises the LED illumination fixture according to any of the aspects described above or the LED illumination device configured as described above; and a phase control dimmer connected to an input side of the LED illumination fixture or the LED illumination device.

According to the present invention, since the phase control element of the phase control dimmer can be prevented from switching off for a period corresponding to several cycles of the oscillation wavelength of the current flowing to the phase control element of the phase control dimmer, it is possible to reduce flickering that can occur when an LED is used together with a phase control dimmer.

BRIEF DESCRIPTION OF THE DRAWINGS

FIG. 20B is an enlarged view of a portion of FIG. 20A; and

DETAILED DESCRIPTION OF PREFERRED EMBODIMENTS

Embodiments of the present invention will be described hereinafter with reference to the drawings.

<<First Embodiment>>

Figure 1:
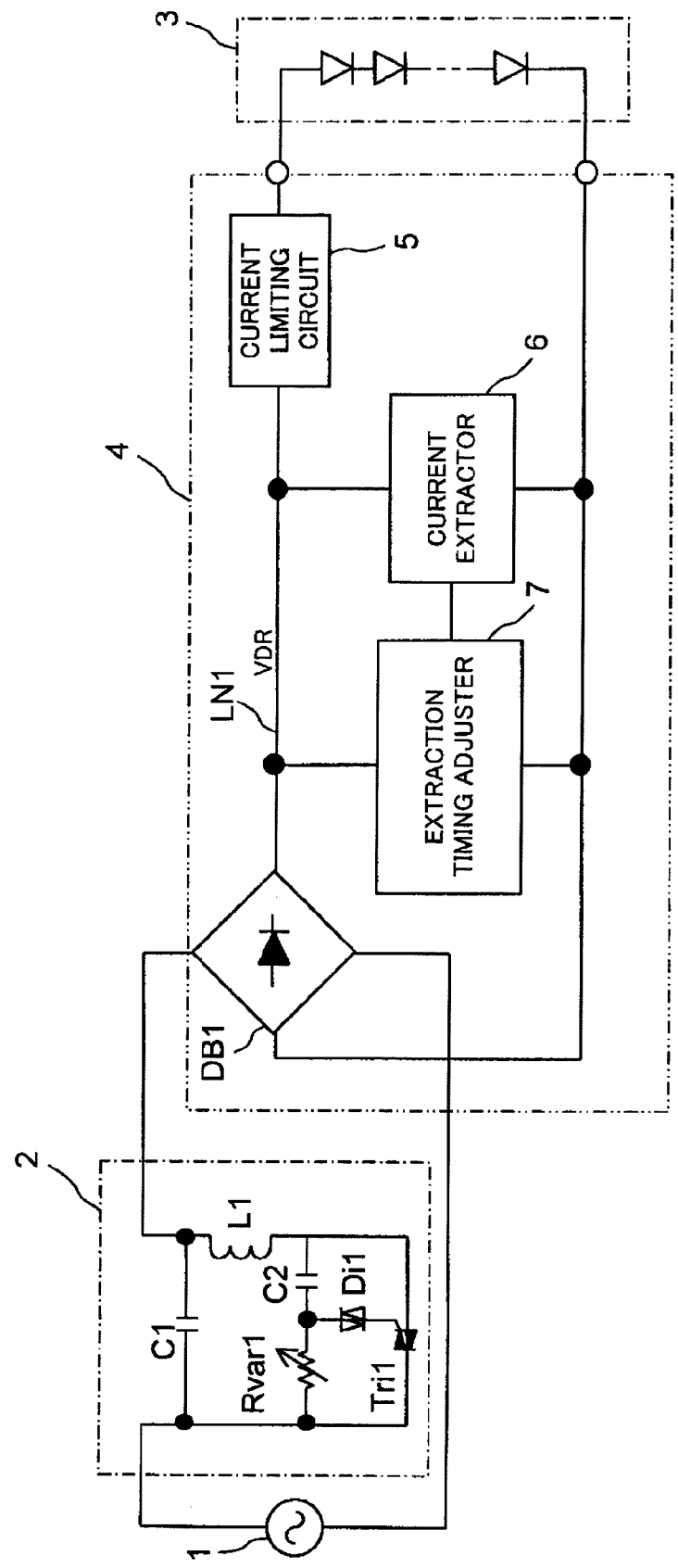
FIG. 1 is a view showing an example of the configuration of the LED illumination system according to the present invention.
Figure 17:
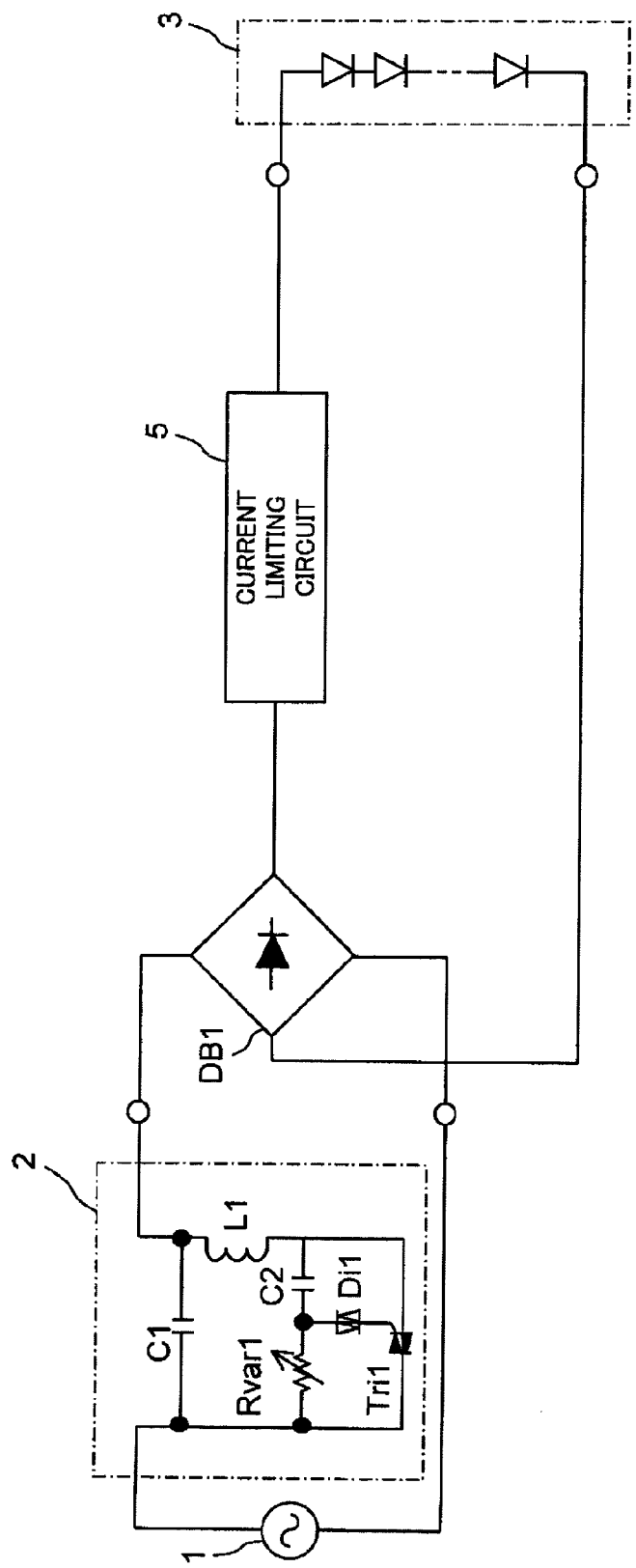
FIG. 17 is a view showing an example of the conventional LED illumination system.
Figure 18:
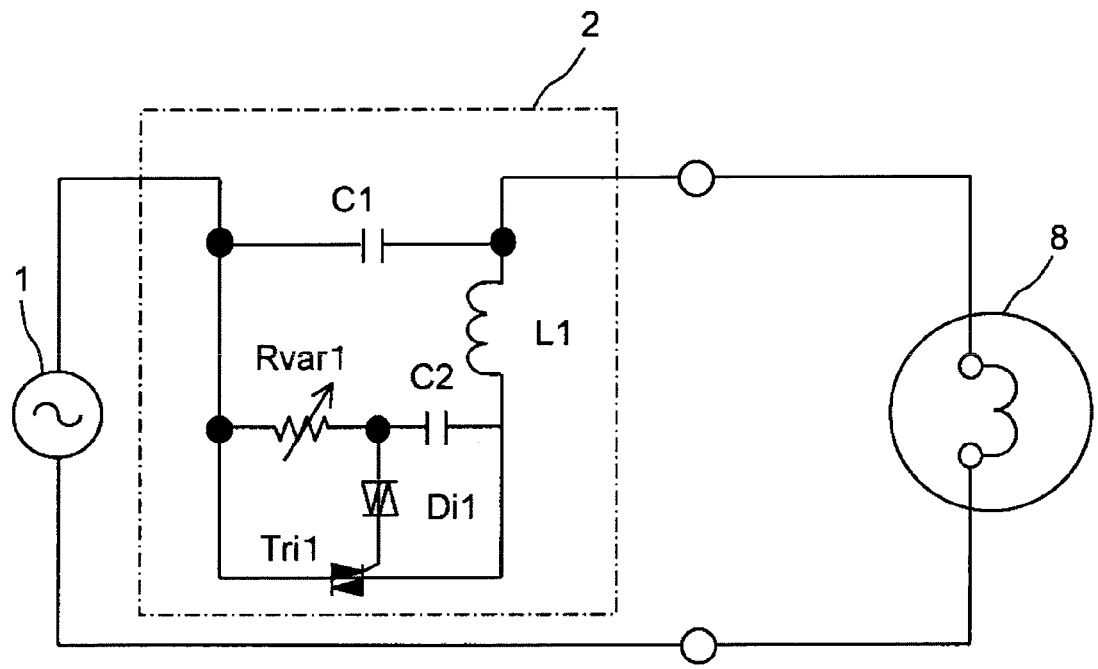
FIG. 18 is a view showing an example of the configuration of an incandescent bulb illumination system.
Figure 19A:
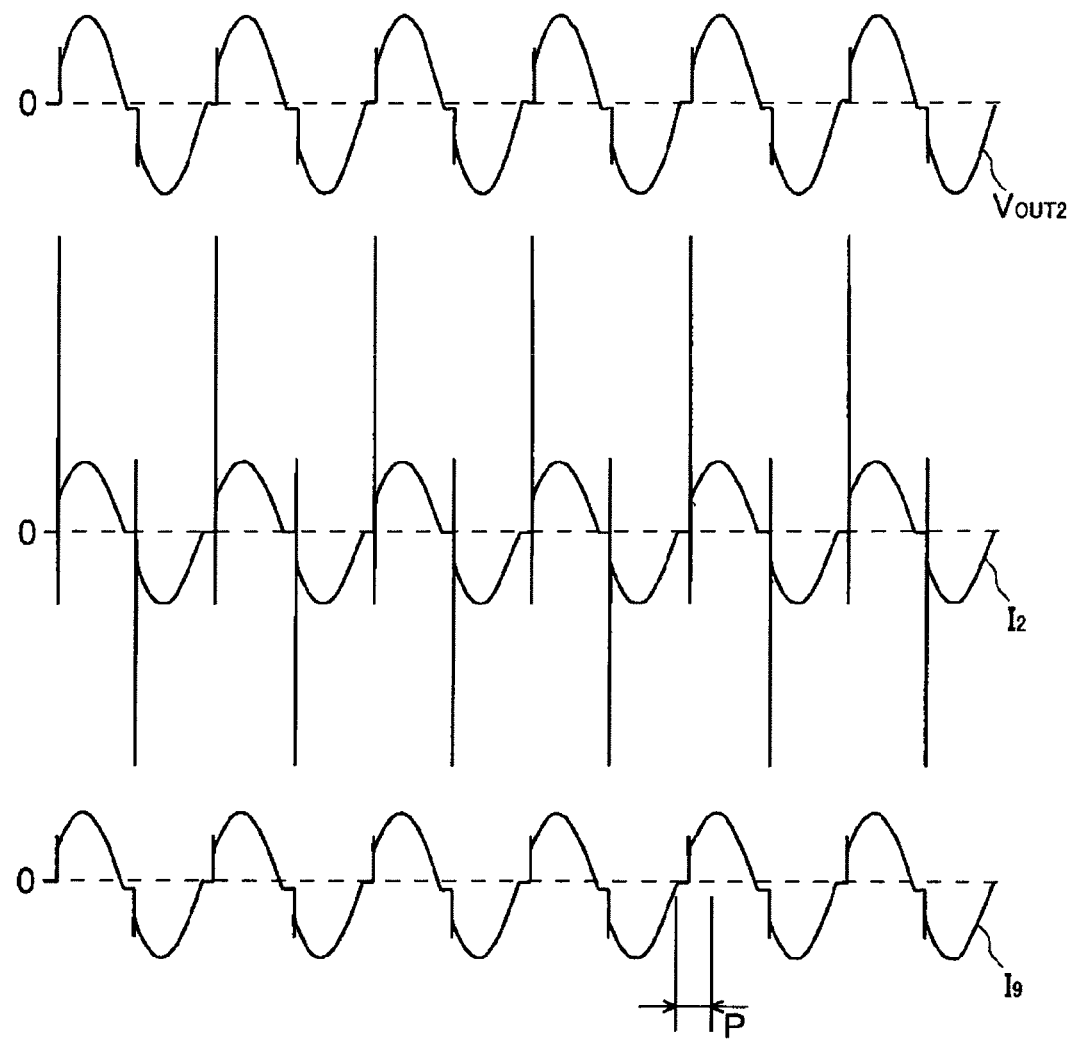
FIG. 19A is a view showing an example of the voltage/current waveform of each component of the incandescent bulb illumination system shown in FIG. 18.
Figure 19B:
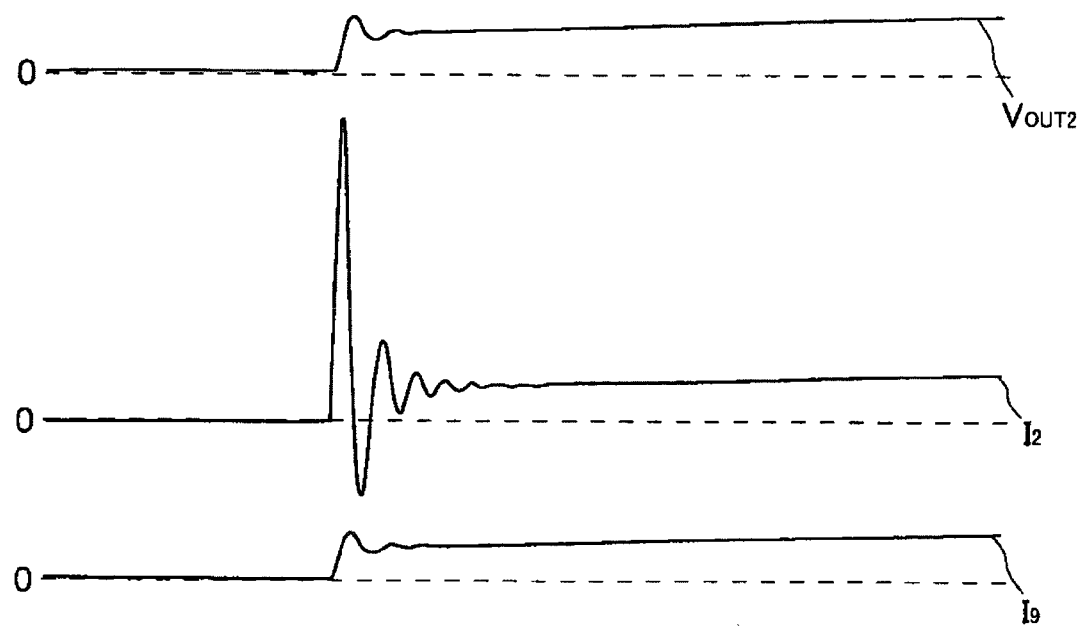
FIG. 19B is an enlarged view of a portion of FIG. 19A.

FIG. 1 shows an example of the configuration of the LED illumination system according to the present invention. The same reference symbols are used in FIG. 1 to refer to components that are the same as those in FIG. 17, and no detailed description thereof will be given. The LED illumination system according to the present invention shown in FIG. 1 is provided with a phase control dimmer 2, an LED module 3, and an LED drive circuit 4. The LED drive circuit 4 is an example of the LED drive circuit according to the present invention, and has a diode bridge DB1, a current limiting circuit 5, a current extractor 6, and an extraction timing adjuster 7. In the LED illumination system according to the present invention shown in FIG. 1, an alternating-current power supply 1, the phase control dimmer 2, the diode bridge DB1, the current limiting circuit 5, and the LED module 3, which is composed of one or more LED elements, are connected in series; and the current extractor 6 and extraction timing adjuster 7 are provided between the diode bridge DB1 and the current limiting circuit 5.

The current extractor 6 extracts a current from a power supply feed line LN1 for feeding an LED drive current to the LED module 3. The extraction timing adjuster 7 causes the current extractor 6 to operate for a predetermined period of time after the start of a voltage fluctuation in the power supply feed line LN1, the voltage fluctuation accompanying output oscillation of the phase control dimmer 2.

Figure 20A:
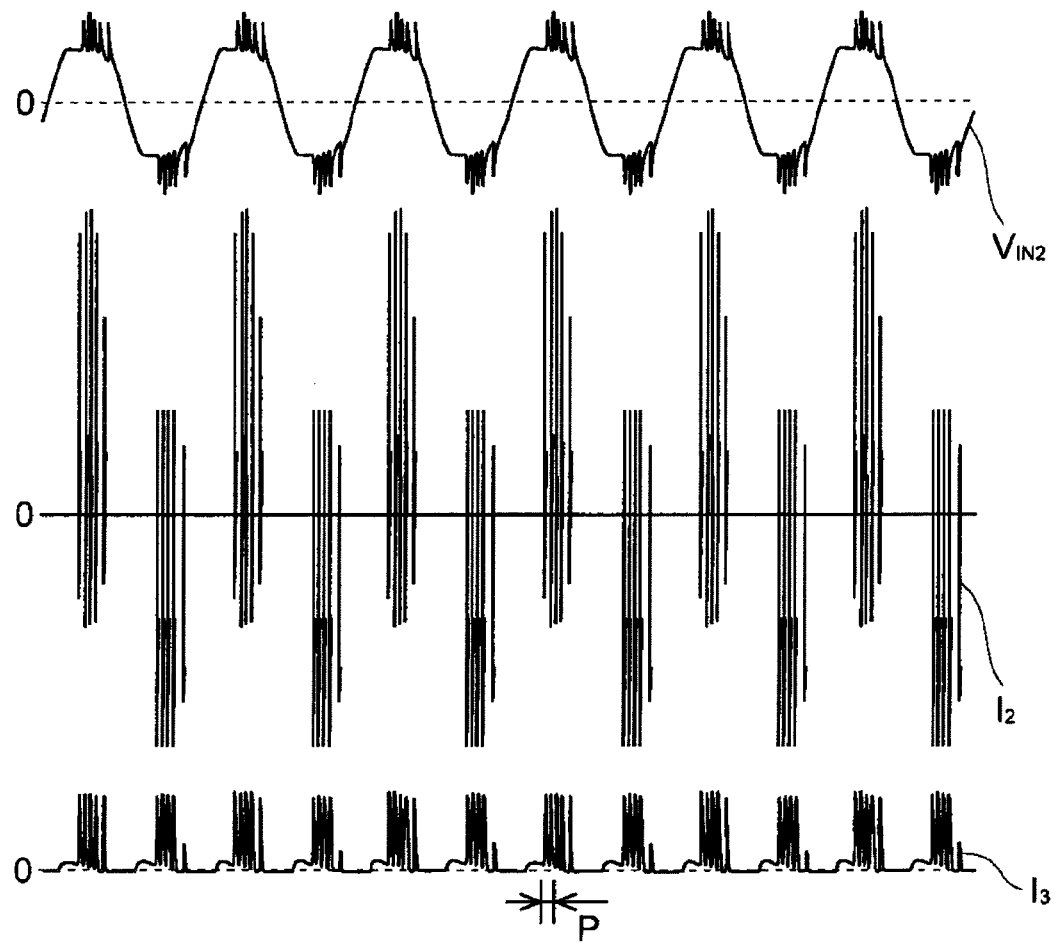
FIG. 20A is a view showing an example of the voltage/current waveform of each component of the LED illumination system shown in FIG. 17.
Figure 21:
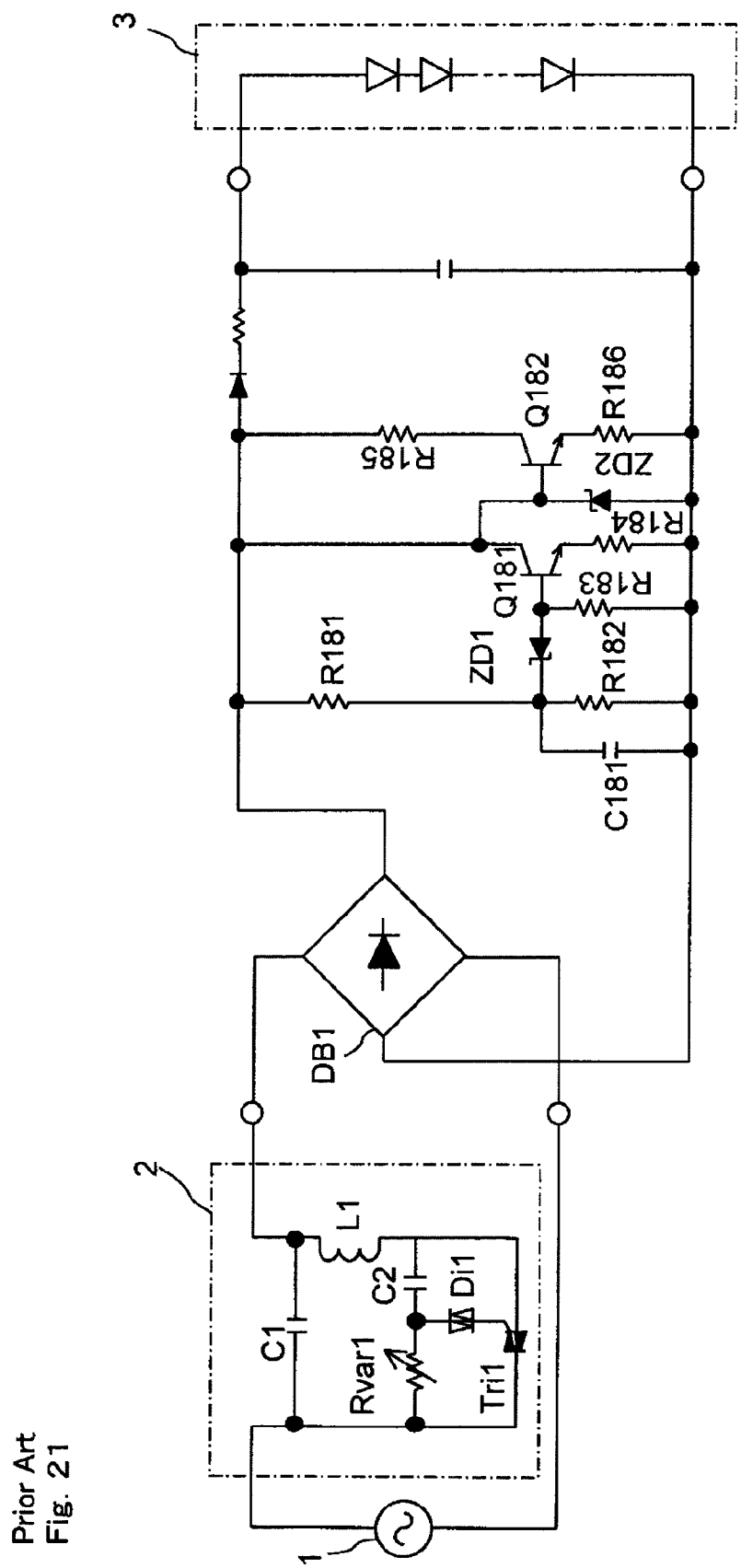
FIG. 21 is a view showing another example of the conventional LED illumination system.

The oscillation wavelength of the current $I_2$ that flows to the triac Tri1 and oscillates immediately after firing of the triac Tri1 as shown in FIG. 20B is dependent on the resonant wavelength $2\pi\sqrt{(LC)}$ of a capacitor C1 and an inductor L1 which constitute a noise prevention filter in the phase control dimmer 2 (where L is the inductance value of the inductor L1, and C is the capacitance of the capacitor C1). Therefore, the time during which the extraction timing adjuster 7 causes the current extractor 6 to operate must be adjusted so that the current flowing to the triac Tri1 does not drop below the holding current of the triac Tri1 for a period of several cycles of the resonant wavelength.

Considering that the current extractor 6 extracts not only the current flowing to the triac Tri1 but also currents not directly flowing to the triac Tri1, the current value of the current extracted by the current extractor 6 is set so that the current flowing to the triac Tri1 does not fall below the holding current of the triac Tri1.

Through a configuration such as described above, the triac Tri1 of the phase control dimmer 2 can be prevented from switching off during the period of several cycles of the oscillation wavelength at which the current flowing to the triac Tri1 oscillates.

<<Second Embodiment>>

Figure 2:
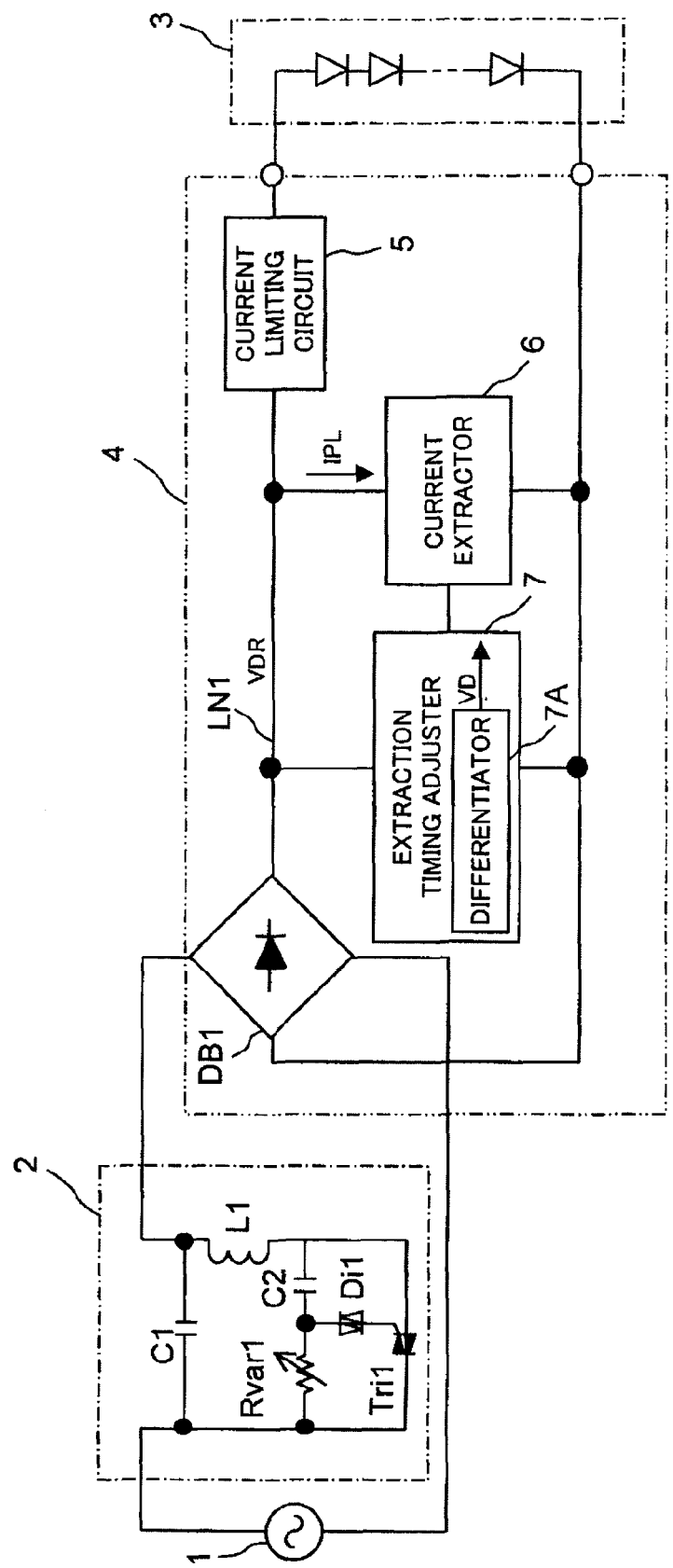
FIG. 2 is a view showing an embodiment of the LED illumination system shown in FIG. 1.
Figure 3:
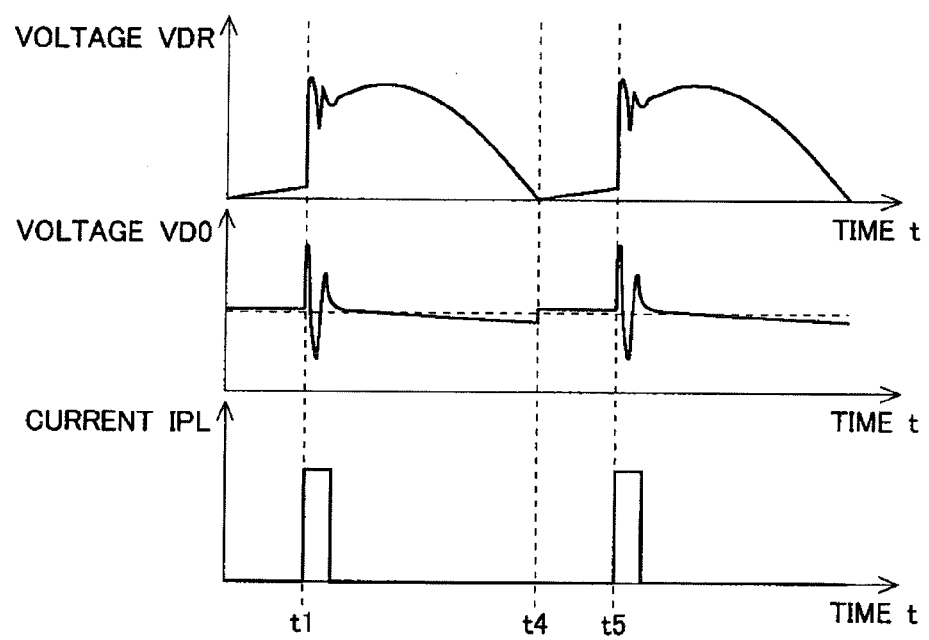
FIG. 3 is a timing chart showing an example of the voltage/current waveform of each component of the LED illumination system shown in FIG. 2.

FIG. 2 shows an embodiment of the LED illumination system shown in FIG. 1. FIG. 3 is a timing chart showing an example of the voltage/current waveform of each component of the LED illumination system shown in FIG. 2. In FIGS. 2 and 3, the reference symbols VDR, DVO, and IPL refer to the voltage of the power supply feed line LN1, the output voltage of a differentiator 7A, and the current extracted by the current extractor 6, respectively.

In the configuration shown in FIG. 2, the extraction timing adjuster 7 has a differentiator 7A for detecting variation of the voltage VDR of the power supply feed line LN1.

Switching on of the triac Tri1 of the phase control dimmer 2 causes the voltage VDR of the power supply feed line LN1 to rise sharply from a low value to a high value (time t1 in FIG. 3). At this time, although the current of the triac Tri1 is reduced by resonance within the phase control dimmer 2, the extraction timing adjuster 7 detects the sudden variation of the voltage VDR of the power supply feed line LN1 on the basis of the output voltage VD0 of the differentiator 7A and causes the current extractor 6 to operate, and the current of the triac Tri1 thereby continues to flow. Through such an operation, the triac Tri1 of the phase control dimmer 2 is prevented from switching off during the period of several cycles of the oscillation wavelength at which the current flowing to the triac Tri1 oscillates.

The extraction timing adjuster 7 also uses the output voltage VD0 of the differentiator 7A to detect the occurrence of resonance in the phase control dimmer 2, and determines operation of the current extractor 6.

<<Third Embodiment>>

Figure 4:
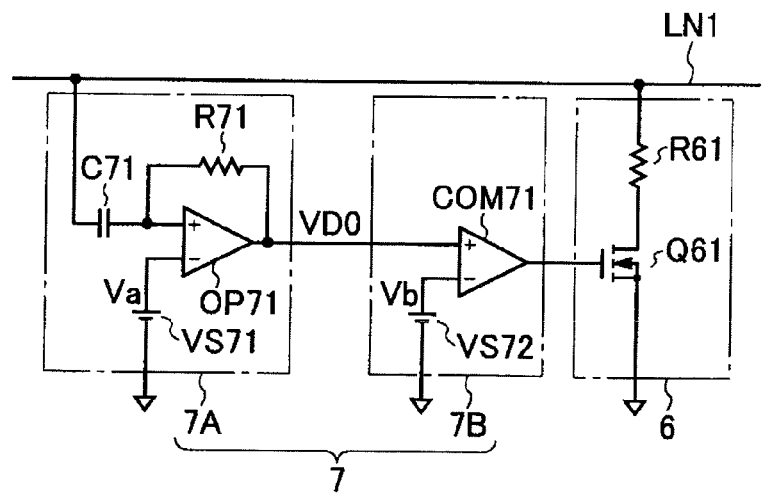
FIG. 4 is a view showing an example of the current extractor and extraction timing adjuster in the configuration shown in FIG. 2.

FIG. 4 shows an example of the current extractor 6 and extraction timing adjuster 7 in the configuration shown in FIG. 2.

In the configuration shown in FIG. 4, the current extractor 6 has a resistor R61 and an NMOS transistor Q61, and the extraction timing adjuster 7 has the differentiator 7A and a comparing element 7B. The differentiator 7A is composed of a capacitor C71, an op-amp OP71, a constant voltage source VS71, and a resistor R71, and the comparing element 7B is composed of a comparator COM71 and a constant voltage source VS72.

The comparator COM71 compares the output voltage VD0 of the differentiator 7A and the constant voltage Vb outputted from the constant voltage source VS72, and when the output voltage VD0 of the differentiator 7A is higher than the constant voltage Vb, the comparator COM71 feeds a high-level signal to the gate of the NMOS transistor Q61 to cause the current extractor 6 to operate.

Since the voltage VDR of the power supply feed line LN1 fluctuates when the triac Tri1 is off as well, the output voltage VD0 of the differentiator 7A also fluctuates when the triac Tri1 is off, but by comparing the constant voltage Vb and the output voltage VD0 of the differentiator 7A, it is possible to detect resonance caused by the on state of the triac Tri1. The constant voltage Vb is made larger than the value the output voltage VD0 of the differentiator 7A has when the triac Tri1 is always off.

<<Fourth Embodiment>>

Figure 5:
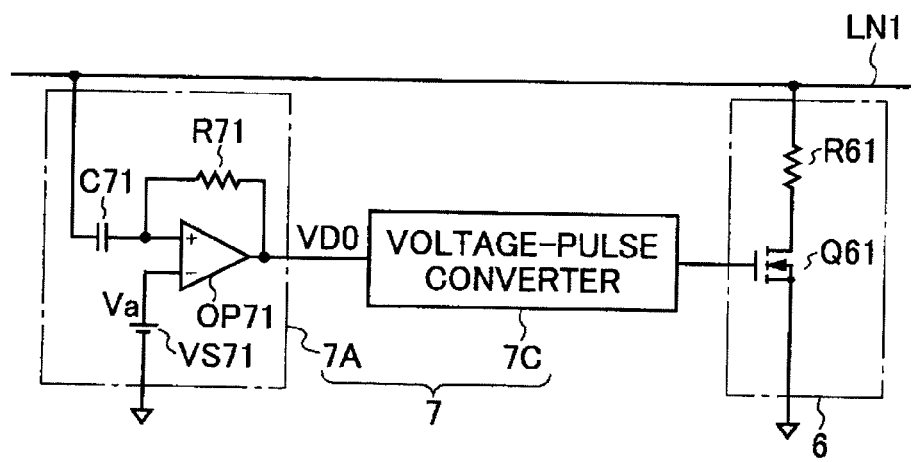
FIG. 5 is a view showing another example of the current extractor and extraction timing adjuster in the configuration shown in FIG. 2.

FIG. 5 shows another example of the current extractor 6 and extraction timing adjuster 7 in the configuration shown in FIG. 2.

In the configuration shown in FIG. 5, the current extractor 6 has a resistor R61 and an NMOS transistor Q61, and the extraction timing adjuster 7 has the differentiator 7A and a voltage-pulse converter 7C. The differentiator 7A is composed of a capacitor C71, an op-amp OP71, a constant voltage source VS71, and a resistor R71.

The comparator COM71 compares the output voltage VD0 of the differentiator 7A and the constant voltage Vb outputted from the constant voltage source VS72, and when the output voltage VD0 of the differentiator 7A is higher than the constant voltage Vb, the comparator COM71 feeds a high-level signal to the voltage-pulse converter 7C. The voltage-pulse converter 7C generates a pulse voltage signal having a pulse width (time width) proportional to the size of the output voltage VD0 of the differentiator 7A, and outputs the pulse voltage signal to the gate of the NMOS transistor Q61. The extraction timing adjuster 7 thereby causes the current extractor 6 to operate for a period corresponding to the pulse width (time width) of the pulse voltage signal outputted from the voltage-pulse converter 7C.

Resonance within the phase control dimmer 2 is caused by energy accumulated in the capacitor C1 in the phase control dimmer 2. When the triac Tri1 switches on at time t2 in FIG. 6A, since the voltage accumulated in the capacitor C1 is small, resonance is not prone to occur in the phase control dimmer 2. On the other hand, when the triac Tri1 switches on at time t3 in FIG. 6B, since the voltage accumulated in the capacitor C1 is large, resonance is prone to occur in the phase control dimmer 2.

Figure 6A:
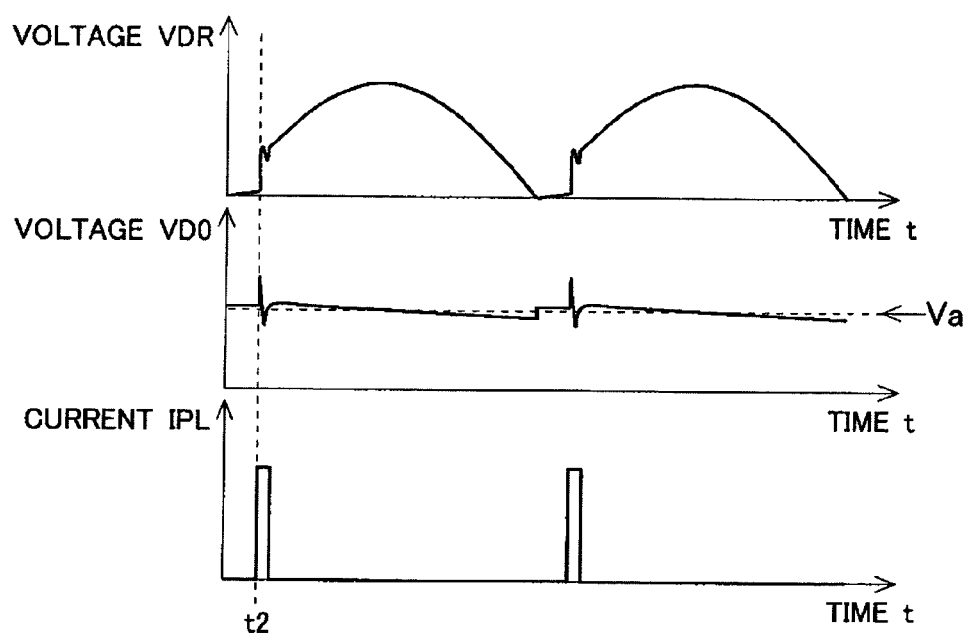
FIG. 6A is a timing chart showing an example of the voltage/current waveform of each component of the LED illumination system according to the example shown in FIG. 5.
Figure 6B:
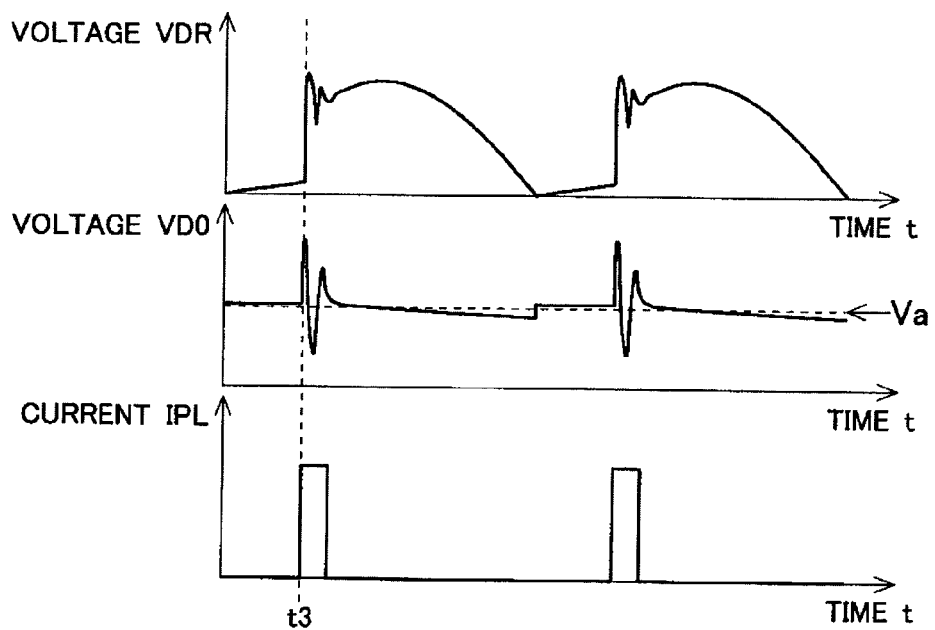
FIG. 6B is a timing chart showing another example of the voltage/current waveform of each component of the LED illumination system according to the example shown in FIG. 5.

When the triac Tri1 switches on at time t2 in FIG. 6A, the output voltage VD0 of the differentiator 7A has a value smaller than the value thereof when the triac Tri1 switches on at time t3 in FIG. 6B. Consequently, by adopting a configuration whereby the output voltage VD0 of the differentiator 7A and the pulse width of the pulse voltage signal outputted to the gate of the NMOS transistor Q61 have a positive correlation, reducing the pulse width of the pulse voltage signal in conditions in which resonance is not prone to occur, and increasing the pulse width of the pulse voltage signal in conditions in which resonance is prone to occur, the time for which the current extractor 6 extracts current from the power supply feed line LN1 can be optimized, and power loss and heat in the current extractor 6 can be even further reduced.

<<Fifth Embodiment>>

Figure 7:
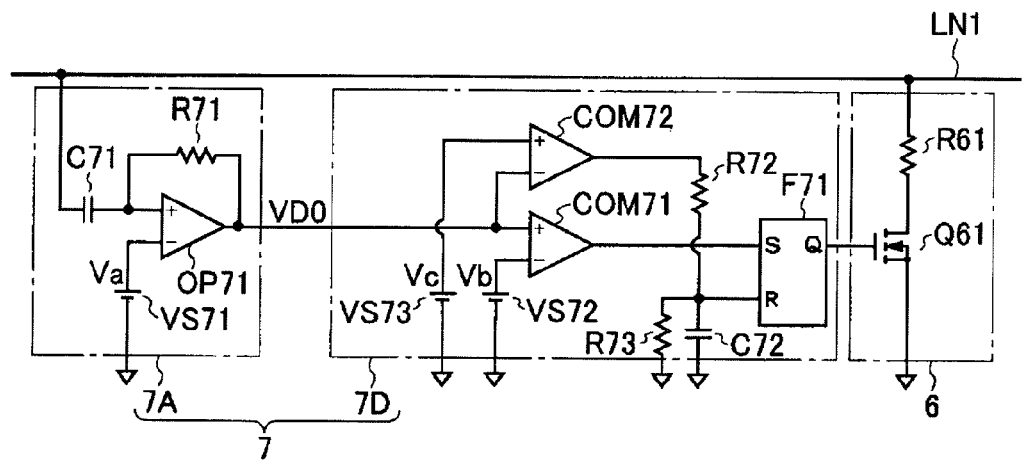
FIG. 7 is a view showing still another example of the current extractor and extraction timing adjuster in the configuration shown in FIG. 2.
Figure 8:
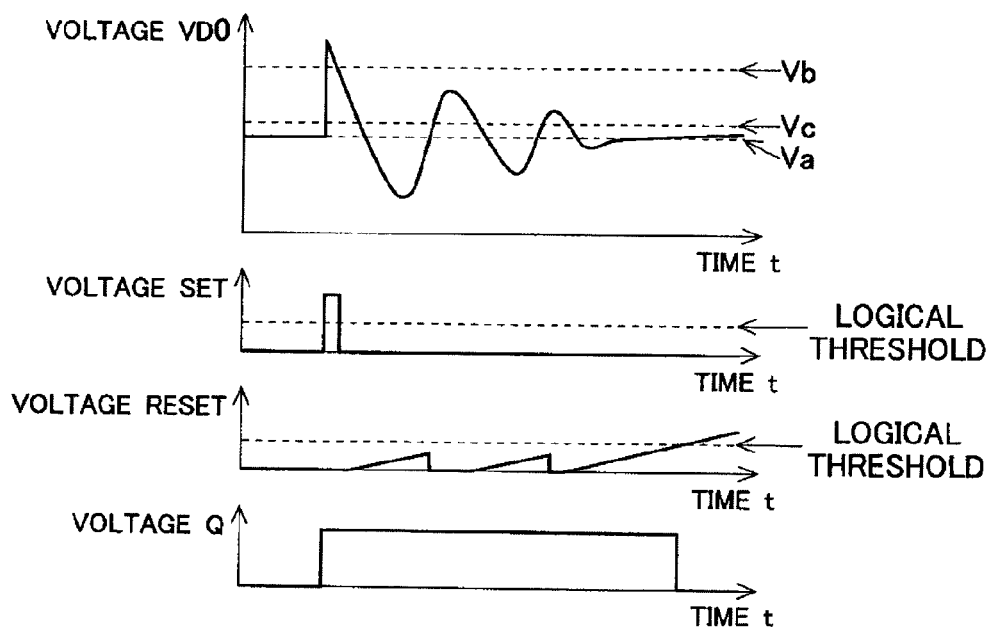
FIG. 8 is a timing chart showing an example of the voltage/current waveform of each component of the LED illumination system according to the example shown in FIG. 7.

FIG. 7 shows still another example of the current extractor 6 and extraction timing adjuster 7 in the configuration shown in FIG. 2. FIG. 8 is a timing chart showing an example of the voltage/current waveform of each component in the configuration shown in FIG. 7.

In the configuration shown in FIG. 7, the current extractor 6 has a resistor R61 and an NMOS transistor Q61, and the extraction timing adjuster 7 has the differentiator 7A and a voltage-pulse converter 7D. The differentiator 7A is composed of a capacitor C71, an op-amp OP71, a constant voltage source VS71, and a resistor R71, and the voltage-pulse converter 7D is composed of comparators COM71 and COM72, constant voltage sources VS72 and VS73, a flip-flop F71, resistors R72 and R73, and a capacitor C72.

When the output voltage VD0 of the differentiator 7A exceeds the constant voltage Vb outputted from the constant voltage source VS72, the output signal (voltage SET) of the comparator COM71 is high-level, the flip-flop F71 is set, and the signal (voltage Q) fed to the gate of the NMOS transistor Q61 from the Q-output terminal of the flip-flop F71 is high-level. Consequently, the extraction timing adjuster 7 causes the current extractor 6 to operate when the output voltage VD0 of the differentiator 7A exceeds the constant voltage Vb.

The output terminal of the comparator COM72 for comparing the output voltage VD0 of the differentiator 7A and the constant voltage Vc outputted from the constant voltage source VS73 is connected to a reset input terminal of the flip-flop F71 via a low-pass filter composed of resistors R72 and R73 and the capacitor C72. The flip-flop F71 is thereby not reset insofar as the output voltage VD0 of the differentiator 7A is not below the constant voltage Vc for a certain amount of time. Consequently, the extraction timing adjuster 7 causes the current extractor 6 to continue to operate as long as the output voltage VD0 of the differentiator 7A is not below the constant voltage Vc for a certain amount of time.

Through such an operation, the triac Tri1 of the phase control dimmer 2 can easily be prevented from switching off during the period of several cycles of the oscillation wavelength at which the current flowing to the triac Tri1 oscillates.

<<Sixth Embodiment>>

Figure 9:
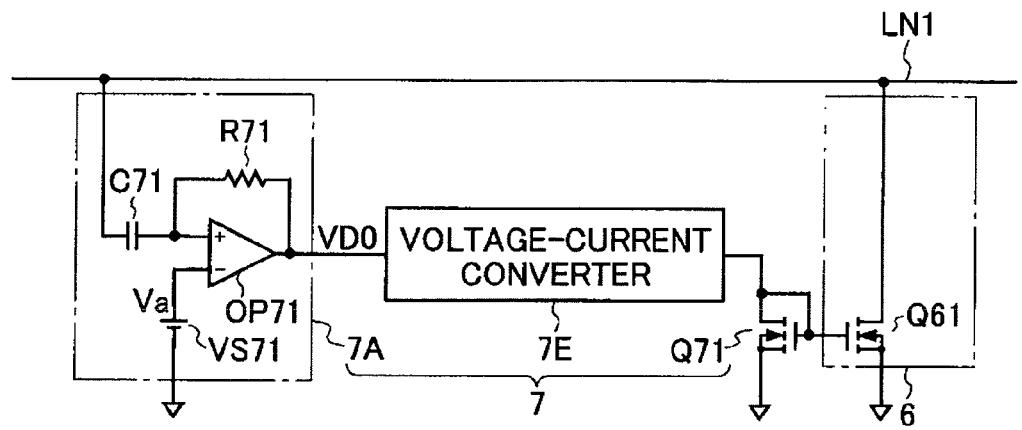
FIG. 9 is a view showing still another example of the current extractor and extraction timing adjuster in the configuration shown in FIG. 2.

FIG. 9 shows still another example of the current extractor 6 and extraction timing adjuster 7 in the configuration shown in FIG. 2.

In the configuration shown in FIG. 9, the current extractor 6 has an NMOS transistor Q61, and the extraction timing adjuster 7 has the differentiator 7A, a voltage-current converter 7E, and an NMOS transistor Q71. The differentiator 7A is composed of a capacitor C71, an op-amp OP71, a constant voltage source VS71, and a resistor R71. The drain and gate of the NMOS transistor Q71 are connected to each other, the gate of the NMOS transistor Q71 and the gate of the NMOS transistor Q61 are connected to each other, and the source of the NMOS transistor Q71 and the source of the NMOS transistor Q61 have the same electrical potential. The NMOS transistors Q71 and Q61 therefore form a current mirror circuit.

A current proportional to the size of the output voltage VD0 of the differentiator 7A flows toward the NMOS transistor Q71 from the voltage-current converter 7E, and a current correspondingly flows to the NMOS transistor Q61, whereby the current extractor 6 operates. The current extractor 6 thus extracts a lesser amount of current in conditions in which resonance is not prone to occur, and the current extractor 6 extracts a larger amount of current in conditions in which resonance is prone to occur. The amount of current extracted from the power supply feed line LN1 by the current extractor 6 is thereby optimized, and power loss and heat in the current extractor 6 can be even further reduced.

<<Seventh Embodiment>>

Figure 10:
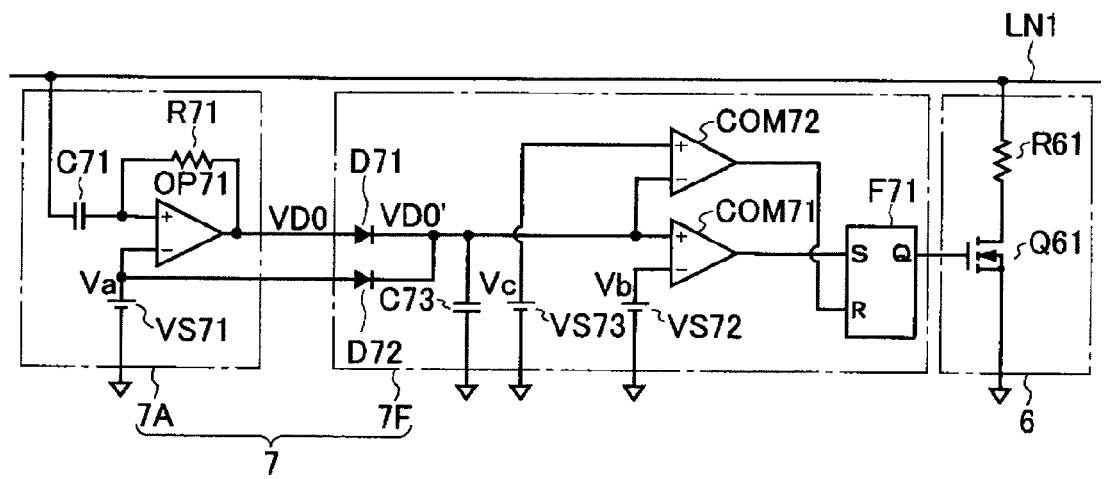
FIG. 10 is a view showing still another example of the current extractor and extraction timing adjuster in the configuration shown in FIG. 2.
Figure 11:
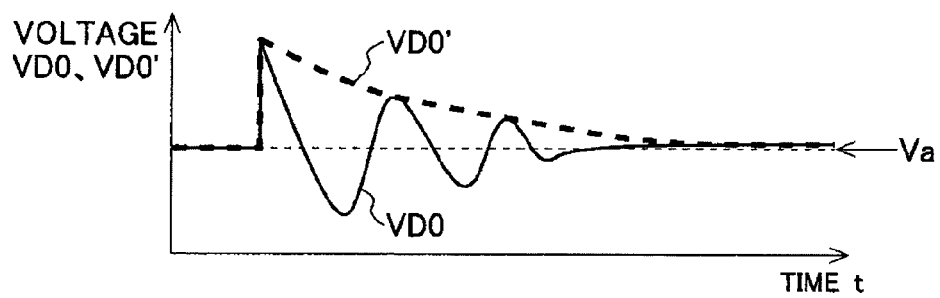
FIG. 11 is a timing chart showing an example of the voltage of each component of the LED illumination system according to the example shown in FIG. 10.

FIG. 10 shows still another example of the current extractor 6 and extraction timing adjuster 7 in the configuration shown in FIG. 2. FIG. 11 is a timing chart showing an example of the voltage of each component in the configuration shown in FIG. 10.

In the configuration shown in FIG. 10, the current extractor 6 has a resistor R61 and an NMOS transistor Q61, and the extraction timing adjuster 7 has the differentiator 7A and a voltage-pulse converter 7F. The differentiator 7A is composed of a capacitor C71, an op-amp OP71, a constant voltage source VS71, and a resistor R71, and the voltage-pulse converter 7F is composed of comparators COM71 and COM72, constant voltage sources VS72 and VS73, a flip-flop F71, diodes D71 and D72, and a capacitor C73.

Since the voltage VDR of the power supply feed line LN1 oscillates for a period of several cycles of the oscillation wavelength at which the current flowing to the triac Tri1 oscillates, the output voltage VD0 of the differentiator 7A also oscillates up and down about an offset value (constant voltage outputted from the constant voltage source VS71) Va (see FIG. 11).

By forming a common connection with the cathode of the diode D71, the anode of which is connected to the output terminal of the differentiator 7A, and the cathode of the diode D72, the anode of which is connected to the output terminal of the constant voltage source VS71, only a voltage higher than the offset value Va is extracted from the output voltage VD0 of the differentiator 7A, and the extracted voltage is smoothed by the capacitor C73, whereby a voltage VD0' (see FIG. 11) is generated that is the envelope curve of the output voltage VD0 of the differentiator 7A. The input to the comparators COM71 and COM72 is thereby stabilized.

When the voltage VD0' exceeds the constant voltage Vb outputted from the constant voltage source VS72, the output signal of the comparator COM71 is high-level, the flip-flop F71 is set, and the signal fed to the gate of the NMOS transistor Q61 from the Q-output terminal of the flip-flop F71 is high-level. When the voltage VD0' drops below the constant voltage Vc outputted from the constant voltage source VS73, the output signal of the comparator COM72 is high-level, the flip-flop F71 is reset, and the signal fed to the gate of the NMOS transistor Q61 from the Q-output terminal of the flip-flop F71 is low-level.

<<Eighth Embodiment>>

Figure 12:
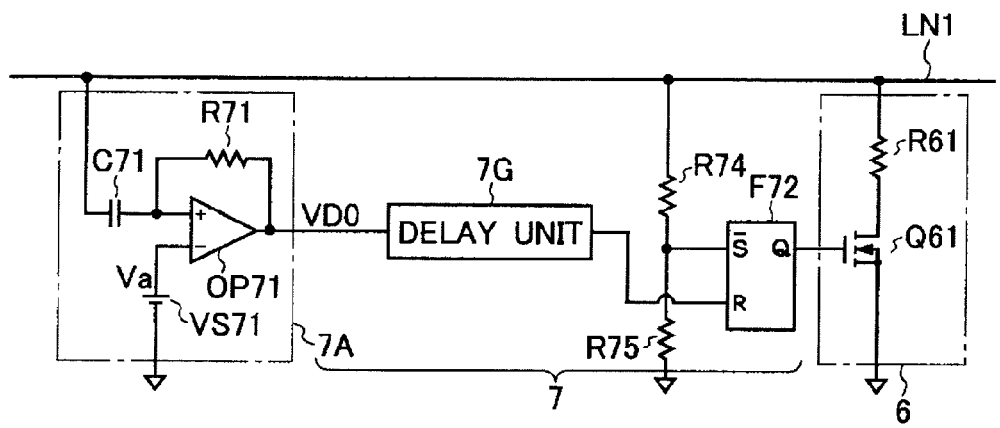
FIG. 12 is a view showing still another example of the current extractor and extraction timing adjuster in the configuration shown in FIG. 2.

FIG. 12 shows still another example of the current extractor 6 and extraction timing adjuster 7 in the configuration shown in FIG. 2.

In the configuration shown in FIG. 12, the current extractor 6 has a resistor R61 and an NMOS transistor Q61, and the extraction timing adjuster 7 has the differentiator 7A, a delay unit 7G, resistors R74 and R75, and a flip-flop F72. The differentiator 7A is composed of a capacitor C71, an op-amp OP71, a constant voltage source VS71, and a resistor R71.

The total impedance of the LED module 3 and the LED drive circuit 4 must be made lower than the impedance in the phase control dimmer 2 when the triac Tri1 of the phase control dimmer 2 is off. Since the total impedance of the LED module 3 and the LED drive circuit 4 is high in a case in which a plurality of LED elements is connected in series in the LED module 3, a low-impedance circuit is usually connected to the power supply feed line LN1 when the triac Tri1 is off. By using the current extractor 6 as a low-impedance circuit, the number of circuit elements can be reduced, and the size and cost of the LED drive circuit 4 can be reduced.

When the voltage VDR of the power supply feed line LN1 decreases and reaches zero as at time t4 in FIG. 3, the partial voltages of the resistors R74 and R75 are low-level, the flip-flop F72 is set, and the signal fed to the gate of the NMOS transistor Q61 from the Q-output terminal of the flip-flop F72 is high-level. After a certain delay time set by the delay unit 7G from the time the output voltage VD0 of the differentiator 7A switches from low-level to high-level, as at time t5 shown in FIG. 3, the flip-flop F72 is reset, and the signal fed to the gate of the NMOS transistor Q61 from the Q-output terminal of the flip-flop F72 changes to low-level. Consequently, the extraction timing adjuster 7 causes the current extractor 6 to operate during the period in which the triac Tri1 is off (e.g., the period from time t4 to time t5 in FIG. 3), and for a predetermined time after the start of voltage fluctuation of the power supply feed line LN1 that accompanies output fluctuation of the phase control dimmer 2.

<<Ninth Embodiment>>

Figure 13:
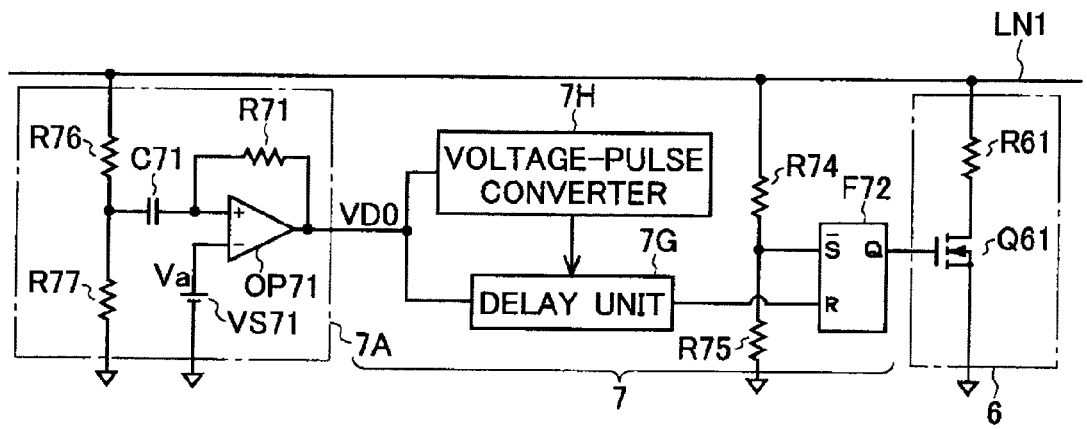
FIG. 13 is a view showing still another example of the current extractor and extraction timing adjuster in the configuration shown in FIG. 2.

FIG. 13 shows still another example of the current extractor 6 and extraction timing adjuster 7 in the configuration shown in FIG. 2.

In the configuration shown in FIG. 13, the current extractor 6 has a resistor R61 and an NMOS transistor Q61, and the extraction timing adjuster 7 has the differentiator 7A, a delay unit 7G, a voltage-pulse converter 7H, resistors R74 and R75, and a flip-flop F72. The differentiator 7A is composed of a capacitor C71, an op-amp OP71, a constant voltage source VS71, a resistor R71, and resistors R76 and R77.

The differences with respect to the eighth embodiment will be described below. In the configuration shown in FIG. 13, the differentiator 7A does not differentiate the voltage VDR of the power supply feed line LN1, but differentiates the result of the voltage VDR of the power supply feed line LN1 being resistance-divided by the resistors R76 and R77. The differentiator 7A can thereby be formed by an element having a low withstand voltage.

The voltage-pulse converter 7H generates a pulse voltage signal having a pulse width (time width) proportional to the size of the output voltage VD0 of the differentiator 7A, and outputs the pulse voltage signal to the delay unit 7G. In the configuration shown in FIG. 13, the delay unit 7G delays the output voltage VD0 of the differentiator 7A by a delay time proportional to the pulse width (time width) of the pulse voltage signal fed from the voltage-pulse converter 7H. By thus creating a positive correlation between the size of the output voltage VD0 of the differentiator 7A and the delay time of the delay unit 7G, the time for which the current extractor 6 extracts current from the power supply feed line LN1 can be optimized, and power loss and heat in the current extractor 6 can be even further reduced.

<<Modifications>>

The input voltage of the LED drive circuit of the present invention is not limited to the Japanese domestic commercial power supply voltage of 100 V. By setting the circuit constant of the LED drive circuit of the present invention to the appropriate value, an overseas commercial power supply voltage or a stepped-down alternating-current voltage can be used as the input voltage of the LED drive circuit of the present invention.

A safer LED drive circuit can also be provided by adding a current fuse or other protective element to the LED drive circuit of the present invention.

The current extractor is provided to the output side of a diode bridge as a stage in front of the current limiting circuit in the configuration of the LED drive circuit according to the present invention described above, but the current extractor may also be provided to the input side of the diode bridge, or the current extractor may be provided to a stage after the current limiting circuit. However, in a case in which the current extractor is provided to a stage after the current limiting circuit, the current flowing to the current extractor must be set to a value lower than the current limiting value of the current limiting circuit.

The current limiting circuit 5 is connected to the anode side of the LED module 3 in the LED drive circuit described above, but setting each circuit constant to the appropriate value enables the current limiting circuit 5 to be connected to the cathode side of the LED module 3 without problem.

Figure 14:
FIG. 14 is a view showing an example of the configuration of the current limiting circuit.

The current limiting circuit 5 is a circuit unit for ensuring that currents that exceed the rated current do not flow to the LED module 3, and a limit may be imposed solely by a resistor or other passive element, or by a combination of a resistor and a transistor or other active element (in the configuration shown in FIG. 14, for example).

In cases in which the current flowing to the LED module 3 has an adequate margin with respect to the rated current of the LED, dimmer operation and other operations are unaffected by the absence of a current limiting circuit 5.

The phase control dimmer used with the LED drive circuit of the present invention is also not limited to the configuration of the phase control dimmer 2 (see FIG. 1).

The voltage inputted to the LED drive circuit of the present invention is not limited to a voltage based on a sine wave alternating-current voltage, and may be another alternating voltage.

All of the LED drive circuits described above are also provided with a diode bridge, but the diode bridge is not an essential constituent element of the LED drive circuit of the present invention. In an example of a configuration in which a diode bridge is not provided, two LED modules having mutually different forward directions are provided, and a current limiting circuit, a current extractor, and an extraction timing adjuster are provided for each LED module. This configuration has advantages in that there is no need for a diode bridge, the power supply efficiency is somewhat enhanced by the fact that there is no need for the diode bridge, and the duty ratio of the LED drive current is half that of a system in which the LED is driven after full-wave rectification, thereby extending the life of the LED (meaning less reduction in luminous flux). This configuration has disadvantages, however, in that the number of LED elements is doubled, thereby increasing cost.

The embodiments and modifications described above can be combined in any manner and implemented insofar as the features thereof are not incompatible with each other.

<<LED Illumination Fixture According to the Present Invention>>

Figure 15:
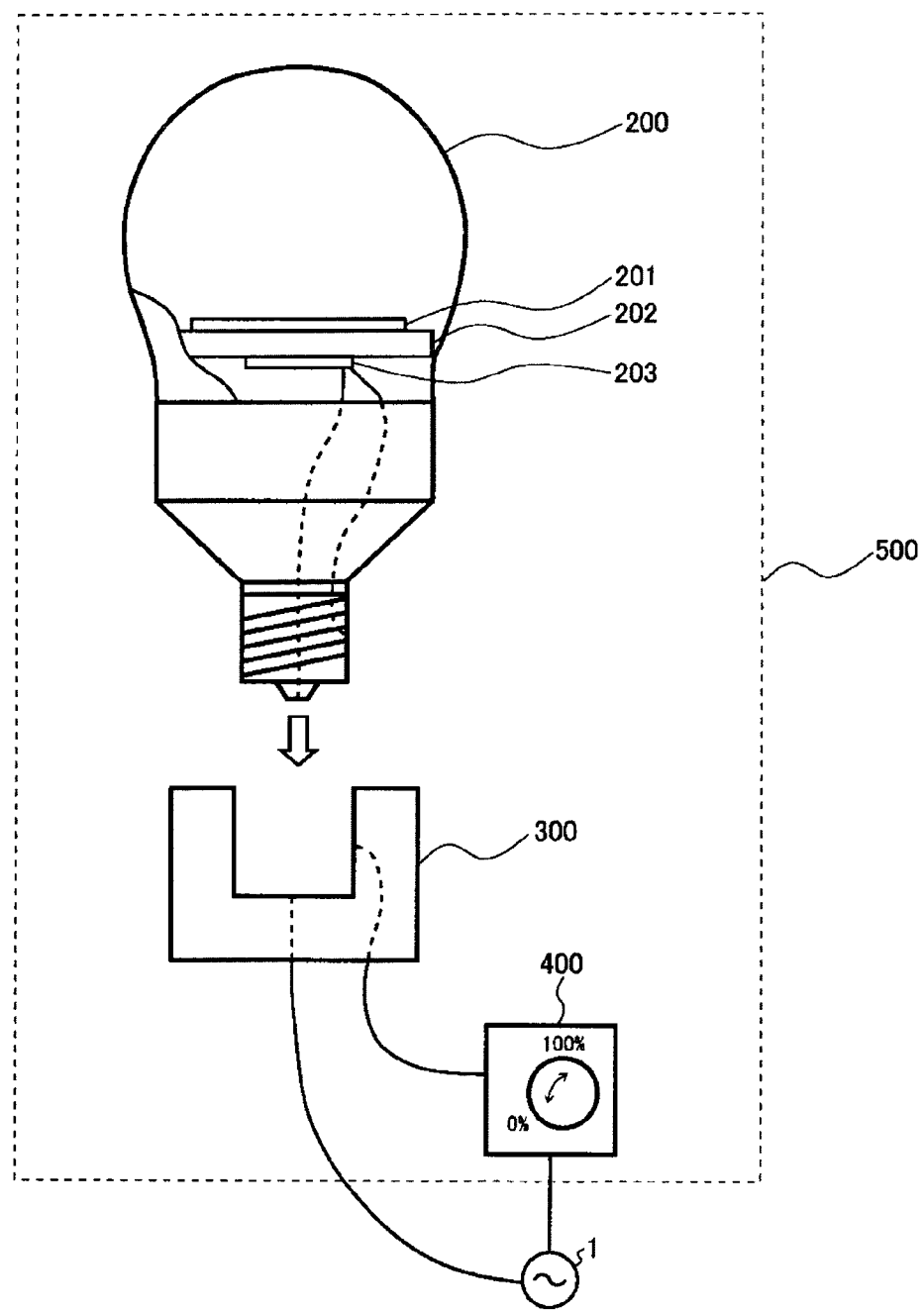
FIG. 15 is a view showing an example of the overall structure of the LED illumination fixture according to the present invention, the LED illumination device according to the present invention, and the LED illumination system according to the present invention.

Lastly, the overall structure of the LED illumination fixture of the present invention will be described. FIG. 15 shows an example of the overall structure of the LED illumination fixture according to the present invention, the LED illumination device according to the present invention, and the LED illumination system according to the present invention. FIG. 15 shows a partial cut-away view of the compact self-ballasted LED illumination fixture 200 of the present invention. A housing or substrate 202, an LED module 201 composed of one or more LED elements provided to the front surface (facing the top of the bulb) of the housing or substrate 202, and a circuit 203 provided to the back surface (facing the bottom of the bulb) of the housing or substrate 202 are provided inside the compact self-ballasted LED illumination fixture 200 of the present invention. The examples of the LED drive circuit of the present invention described above, for example, may be used in the circuit 203. The circuit 203 is also not limited to the examples of the LED drive circuit of the present invention described above, and it is apparent that the circuit 203 may be any circuit provided at least with a circuit (LED flicker reduction unit) capable of reducing flickering or blinking of the LED that occurs when the hold current of the phase control element is inadequate because of voltage fluctuation of the power supply line in conjunction with oscillation of the output of the phase control dimmer.

An LED illumination fixture mount 300 in which the compact self-ballasted LED illumination fixture 200 of the present invention is mounted, and a light controller (phase control dimmer) 400 are connected in series to the alternating-current power supply 1. The compact self-ballasted LED illumination fixture 200 of the present invention and the LED illumination fixture mount 300 constitute an LED illumination device (ceiling light, pendant light, kitchen light, recessed light, floor lamp, spotlight, foot light, or the like).

The LED illumination system 500 of the present invention is formed by the compact self-ballasted LED illumination fixture 200 of the present invention, the LED illumination fixture mount 300, and the light controller 400. The LED illumination fixture mount 300 is disposed on an interior ceiling wall surface, for example, and the light controller 400 is disposed on an interior side wall surface, for example.

Since the compact self-ballasted LED illumination fixture 200 of the present invention can be attached to and detached from the LED illumination fixture mount 300, flickering or blinking of the LED that occurs when the hold current of the phase control element is inadequate because of voltage fluctuation of the power supply line in conjunction with oscillation of the output of the phase control dimmer can be reduced merely by replacing the incandescent bulb, fluorescent lamp, or other illumination fixture with the compact self-ballasted LED illumination fixture 200 of the present invention in an existing illumination device and illumination system in which a conventional incandescent bulb, fluorescent lamp, or the like was used.

FIG. 15 shows the appearance of the light controller 400 in a case in which the light controller 400 is the phase control dimmer shown in FIG. 1, and the light controller 400 is configured so that the degree of dimming can be varied by using a volume knob. A configuration may also be adopted in which the degree of dimming can be varied by using a volume slider instead of a knob.

The light controller 400 is described above as being directly operable by a person through the use of a volume knob or volume slider, but this configuration is not limiting; a person may also remotely operate the light controller 400 by using a remote control or other wireless signal. Specifically, remote operation is possible by providing a wireless signal receiver to the body of the light controller as the receiving side, and providing a transmitter body (e.g., a remote control transmitter, a mobile terminal, or the like) as the transmitting side with a wireless signal transmission unit for transmitting light control signals (e.g., a dimmer signal, a light on/off signal, and other signals) to the wireless signal receiver.

Figure 16:
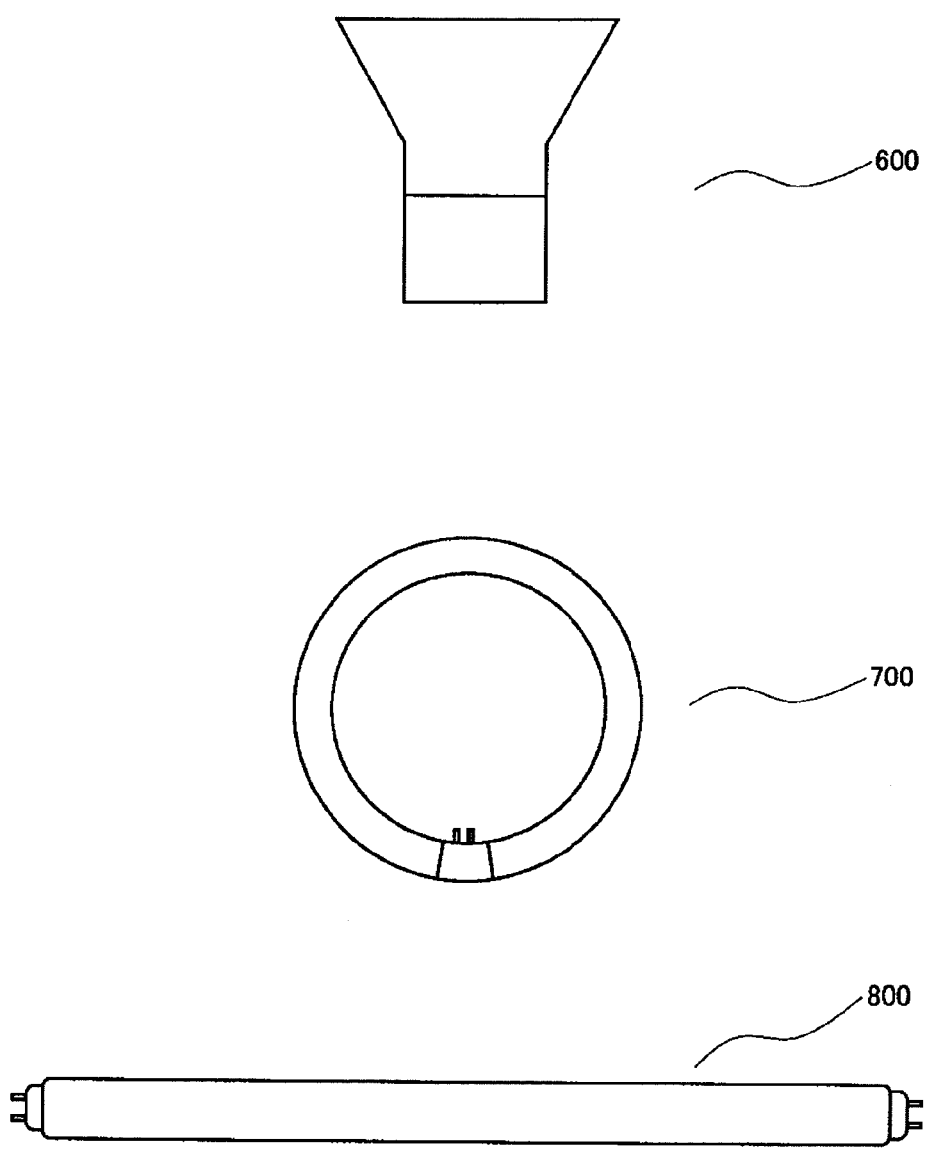
FIG. 16 is a view showing another example of the overall structure of the LED illumination fixture according to the present invention.

The LED illumination fixture of the present invention is not limited to a compact self-ballasted LED illumination fixture, and may be the lamp-type LED illumination fixture 600, the ring-type LED illumination fixture 700, or the straight tube-type LED illumination fixture 800 shown in FIG. 16. In any of these types of illumination fixtures, the LED illumination fixture of the present invention is provided inside with at least an LED and a circuit (LED flicker reduction unit) capable of reducing flickering or blinking of the LED that occurs when the hold current of the phase control element is inadequate because of voltage fluctuation of the power supply line in conjunction with oscillation of the output of the phase control dimmer.

What is claimed is:

1. An LED drive circuit in which an alternating voltage is input and an LED is driven, and which is capable of connecting to a phase control dimmer, the LED drive circuit comprising:
   a current extractor for extracting a current from a power supply feed line for feeding an LED drive current to said LED; and
   an extraction timing adjuster for causing said current extractor to operate for a predetermined period of time after the start of a voltage fluctuation in said power supply feed line, the voltage fluctuation accompanying output oscillation of said phase control dimmer, wherein said extraction timing adjuster includes a differentiator for inputting the voltage of said power supply feed line, and operation of said current extractor is determined by using the output of said differentiator.

2. The LED drive circuit according to claim 1, wherein said extraction timing adjuster causes said current extractor to operate when the output of said differentiator exceeds a certain value.

3. The LED drive circuit according to claim 1, wherein said extraction timing adjuster determines the operating time of said current extractor in accordance with the output value of said differentiator.

4. The LED drive circuit according to claim 1, wherein said extraction timing adjuster causes said current extractor to continue to operate until the output of said differentiator falls below a certain value.

5. The LED drive circuit according to claim 1, wherein said extraction timing adjuster determines the amount of current extraction of said current extractor in accordance with the output value of said differentiator.

6. The LED drive circuit according to claim 1, wherein said extraction timing adjuster determines operation of said current extractor by using an envelope curve of the output of said differentiator.

7. The LED drive circuit according to claim 1, wherein said extraction timing adjuster causes the current extractor to operate also when a phase control element of said phase control dimmer is off.

8. The LED drive circuit according to claim 7, wherein said extraction timing adjuster has a delay unit; the delay time of said delay unit has a positive correlation with the output value of said differentiator; and said extraction timing adjuster stops operation of said current extractor when the delay time has elapsed after the output of said differentiator has exceeded a certain value.

9. The LED drive circuit according to claim 1, wherein said differentiator has a voltage divider circuit for dividing the voltage of said power supply feed line at an input stage.

10. An LED illumination fixture, comprising:
an LED drive circuit; and
an LED connected to an output side of said LED drive circuit, wherein
said LED drive circuit is an LED drive circuit in which an alternating voltage is input and said LED is driven, and which is capable of connecting to a phase control dimmer,
the LED drive circuit includes
  a current extractor for extracting a current from a power supply feed line for feeding an LED drive current to said LED; and
  an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

11. An LED illumination device, comprising:
an LED drive circuit, wherein
said LED drive circuit is an LED drive circuit in which an alternating voltage is input and an LED is driven, and which is capable of connecting to a phase control dimmer,
the LED drive circuit includes
  a current extractor for extracting a current from a power supply feed line for feeding an LED drive current to said LED; and
  an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

12. An LED illumination device, comprising:
an LED illumination fixture, wherein
said LED illumination fixture is an LED illumination fixture including
  an LED drive circuit; and
  an LED connected to the output side of said LED drive circuit,
said LED drive circuit is an LED drive circuit in which an alternating voltage is input and said LED is driven, and which is capable of connecting to a phase control dimmer the LED drive circuit including
  a current extractor for extracting a current from a power supply feed line for feeding an LED drive current to said LED; and
  an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

13. An LED illumination system, comprising:
an LED illumination fixture; and
a phase control dimmer connected to an input side of said LED illumination fixture, wherein
said LED illumination fixture is an LED illumination fixture including
  an LED drive circuit; and
  an LED connected to an output side of said LED drive circuit,
said LED drive circuit is an LED drive circuit in which an alternating voltage is input and said LED is driven, and which is capable of connecting to a phase control dimmer,
the LED drive circuit includes
  a current extractor for extracting a current from a power supply feed line for feeding an LED drive current to said LED; and
  an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

14. An LED illumination system comprising:
an LED illumination device; and
a phase control dimmer connected to an input side of said LED illumination device, wherein
said LED illumination device is an LED illumination device, including
   an LED drive circuit,
said LED drive circuit is an LED drive circuit in which an alternating voltage is input and an LED is driven, and which is capable of connecting to a phase control dimmer,
the LED drive circuit includes
   a current extractor for extracting a current from a power supply feed line for feeding an LED drive current to said LED; and
   an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

15. An LED illumination system, comprising:
an LED illumination device; and
a phase control dimmer connected to an input side of said LED illumination device, wherein
said LED illumination device is an LED illumination device, including
   an LED illumination fixture,
said LED illumination fixture is an LED illumination fixture, including
   an LED drive circuit; and
   an LED connected to an output side of said LED drive circuit,
said LED drive circuit is an LED drive circuit in which an alternating voltage is input and said LED is driven, and which is capable of connecting to a phase control dimmer,
the LED drive circuit includes
   a current extractor for extracting a current from a power supply feed line for feeding an LED drive current to said LED; and
   an extraction timing adjuster for causing said current extractor to operate for a predetermined period of time after the start of a voltage fluctuation in said power supply feed line, the voltage fluctuation accompanying output oscillation of said phase control dimmer, and
said extraction timing adjuster includes a differentiator for inputting the voltage of said power supply feed line, and operation of said current extractor is determined by using the output of said differentiator.

* * * * *